Dec. 16, 1969     A. F. AUNSPAUGH     3,484,066
FISHING ROD AND REEL HOLDER
Filed Aug. 1, 1967     2 Sheets-Sheet 2
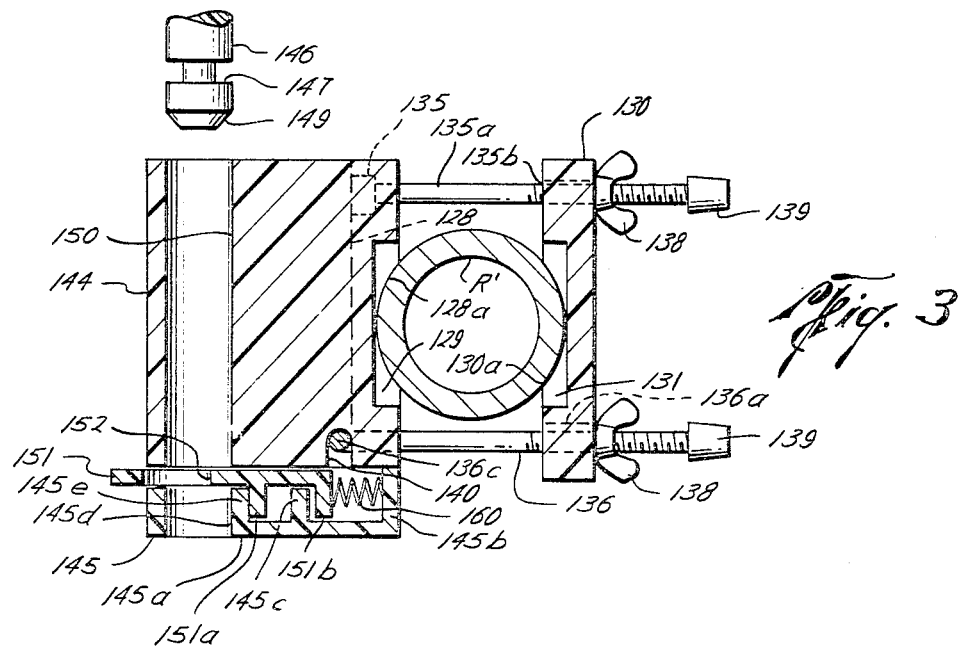
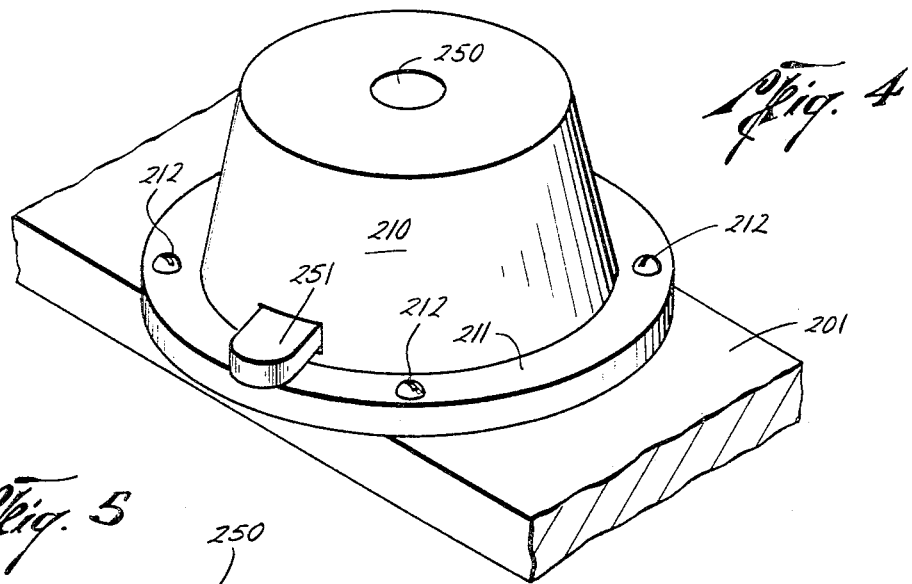
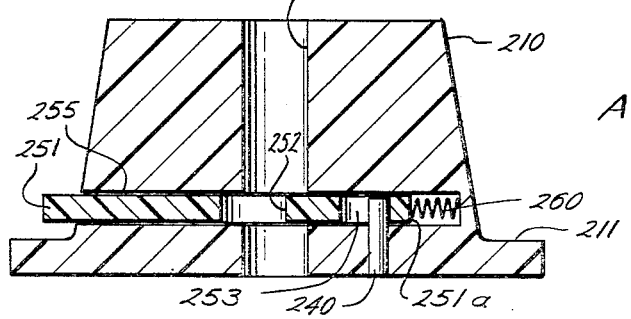
Aaron F. Aunspaugh
INVENTOR
BY
Hayden Pravel Wilson & Matthews
ATTORNEYS

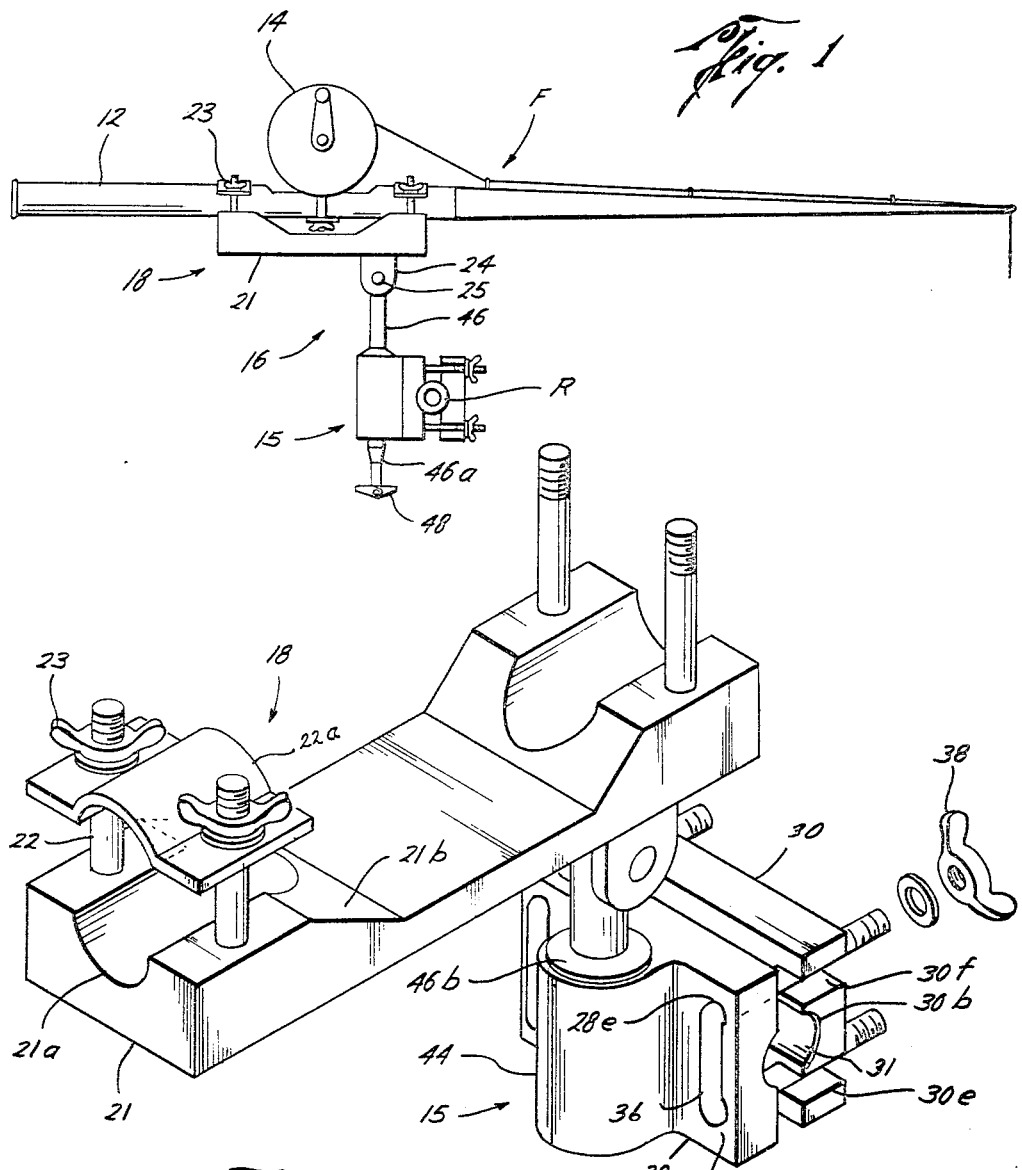

United States Patent Office 3,484,066
Patented Dec. 16, 1969

3,484,066
FISHING ROD AND REEL HOLDER
Aaron F. Aunspaugh, 5638 Northridge,
Houston, Tex. 77033
Continuation-in-part of application Ser. No. 538,675,
Mar. 30, 1966. This application Aug. 1, 1967, Ser.
No. 657,597
Int. Cl. A01k 97/10
U.S. Cl. 248—41    3 Claims

ABSTRACT OF THE DISCLOSURE

A movable fishing rod support apparatus for mounting a fishing rod on a side rail or other structural portion of a boat wherein the support apparatus is rotatable about a vertical axis and also pivotal on a horizontal axis to facilitate support and handling of a fishing rod while in use.

CROSS-REFERENCES TO RELATED APPLICATIONS

This application is a continuation-in-part of my co-pending application filed Mar. 30, 1966 and bearing Ser. No. 538,675.

SUMMARY OF THE INVENTION

This invention relates to a fishing accessory for use on boats having a rail or relative to a pipe stand, where desired, wherein the effort and strain involved in fishing is materially alleviated and wherein the fishing gear is supported while yet movable to the fullest extent necessary to engage in the sport of fishing.

Fishing and especially deep sea fishing can be difficult work for those of good physical condition and is quite a strain on those who are of advanced years, or who may be physically unaccustomed to the effort and peculiar strain on the human body caused by fishing. This invention provides a means whereby the effort is reduced and wherein balance of the fishing equipment is markedly altered to permit directing all energy so expended to the desired retrieval of the fishing line in the most efficient manner. An important side benefit of the present invention is protection of the rather expensive fishing apparatus from loss overboard in deep water.

With these objects and others in view, it is therefore an object of this invention to provide a new and improved fishing accessory for attachment of a fishing rod relative to the boat or boat rail to prevent losing the fishing apparatus over the side of the boat.

Another object of the present invention is to provide a new and improved fishing gear attachment for use on a boat rail wherein the physical labor is materially reduced as a result of properly balancing the fishing gear.

An important object of the present invention is to provide a new and improved attachment for use with deep sea fishing rods and reels which fixes the rod and reel relative to the boat rail while yet permitting freedom of the rod and reel so as to not hamper the routine movements or motions of fishermen.

One object of the present invention is to provide a boat rail attachment adaptable for use with a great variety of fishing rods and reels.

Another object of the present invention is to provide boat rail attachment means for use with a fishing rod of a new and improved nature which is movable relative to the rail.

Other objects and advantages of the present invention will become more readily apparent from an examination and reading of the enclosed specification and drawings and wherein:

BRIEF DESCRIPTION OF THE DRAWINGS

FIG. 1 is a side view of the means of the present invention attached to a fishing rod and secured relative to a boat rail;

FIG. 2 is an isometric view of the present invention illustrating greater details thereof;

FIG. 3 is a vertical sectional view showing details of construction of an alternate embodiment of the present invention;

FIG. 4 is an isometric view of a second embodiment of the apparatus of the present invention; and FIG. 5 is a vertical sectional view of the structure depicted in FIG. 4.

DESCRIPTION OF THE PREFERRED EMBODIMENTS

In the drawings, attention is directed to FIG. 1 which illustrates the boat rail R or firmly located fixture providing a place or position for securing the means of the present invention for receiving and supporting therein fishing apparatus indicated generally at F. The fishing apparatus includes the rod 12 and a conventional drum type reel 14. The rod and reel are attached to one another in the conventional manner and the apparatus is rigged for fishing with any predetermined length of line placed in the water for retrieving fish therefrom. Included in FIG. 1 in the main is means for fixedly engaging the boat rail indicated generally at 15. Such means is functionally connected to a joint means indicated generally at 16. In addition, there is included releasable connective means indicated generally at 18 which are adapted to be secured to a fishing rod while transferring motion through the universal joint means 16 to permit full freedom of movement to the fishermen on use of the fishing apparatus F.

Considering the invention more in detail, attention is directed to the structure shown in FIG. 2. The connective means 18 is shown as including a platelike member 21 which is adapted to be secured parallel to and adjacent to the lower, heavier end of a fishing rod as shown in FIG. 1. Ordinarily, the fishing rod is tapered from its upward tip toward a lower, heavier end which is usually a handle and which is customarily of some larger diameter. The member 21, shown in FIG. 2, includes a slightly dished-out portion 21a extending approximately the full length thereof for receiving in arcuate contact a portion of the handle of the fishing rod. In addition, the member 21 is slightly dished out at the central portion as best indicated at 21b to accommodate the conventional connecting apparatus found in most combined rod and reel structures wherein the reel is secured relative to the rod. Of particular interest to the present invention is the fact that a clamp member 22 is provided with the member 22a for extending over the fishing rod and securing same relative to the slightly contoured member 21. The clamp means 22 is preferably duplicated at each end of the member 21 so as to provide two points of engagement relative to the fishing rod 12. The clamp members shown in FIG. 2 are preferably threaded on each end and are generally formed into double ended clamp members wherein both ends are adapted to be extended through openings in the member 21. Each member is secured in position by wing nuts which are best shown in FIG. 1 at 23.

The lower side of the member 21 includes a pair of downwardly projecting ears indicated at 24. The ears are spaced relative to one another to permit passage therethrough of means yet to be described and the ears are also preferably aligned along the length of the member 21 so as to provide a tendency to balance in operation of the present invention.

Referring again to FIG. 1, it should be noted that the ears 24 are located towards the tip end of the fishing rod 12 as one means of achieving a balance of the movable apparatus about an axis through the ears 24. It can be appreciated that the movement of the flexible portion of the rod 12 which extends some distance therefrom is best counterbalanced by the movement of rotation of the handle and reel as accommodated by the slight shift in location of the projecting ears 24 along the longitudinal length of the support member 21. A pivot member or rotatable shaft 25 is placed through the ears and provides a degree of freedom for the joint means 16 noted hereinabove and preferably provides at least 170° of rotation about the axis 25 as will be described hereinafter.

Briefly, it should be noted that the means of the present invention provides a rotatable and pivotal joint between the boat rail and the fishing apparatus; such joint incorporates a pair of pivot means as will be described which is provided with mutually perpendicular axes wherein rotation is accomplished fully 360° about one of the axes and preferably at least 170° about the other axis. By these means, full freedom of movement of the fishing apparatus is permitted as will be stated in greater detail hereinafter. However, it is believed expeditious to first described in greater detail the means indicated generally at 15 which are adapted for connecting the apparatus of the present invention to the boat rail and fixing same relative thereto.

In FIG. 2, the means 15 includes a pair of clamp members which is indicated at 28 and 30. The member 30 is preferably a platelike or planar member which has surfaces contoured therein for contact against the boat rail. More specifically, the platelike member 30 includes the contoured surfaces 30a and 30b which are illustrated in FIG. 2 as providing a slightly arcuate surface which is preferably contoured to the shape of the boat rail R. The surfaces 30a and 30b may be arcs of a circle or may have any other curvature so long as the curvature is preferably matched to the shape of the boat rail R. It should be further noted that a frictionable material 31 is preferably placed in the curvature as best illustrated at the right side of FIG. 2 so as to prevent slippage of the clamp member 30 when engaged relative to the rail R.

The matching and opposed platelike member 28 is also contoured as the member 30 described hereinabove. Such member 28 can approximate a mirror image of the member 30 on the opposing face thereof if so desired. However, there are differences in the member 28 as will be noted in detail hereinafter.

It is desirable to clamp the means indicated generally at 15 to the boat rail, and to this end, there is provided a pair of connectors, one of which is best illustrated at 36. The connector 36 is in the form of a U-bolt which is passed through a pair of holes 28e and 28f which is formed in the platelike member 28. The holes 28e and 28f are preferably aligned with slots formed in the clamp member 30, indicated at 30e and 30f. The ends of the U-bolt 36 are shown projecting downwardly through the holes 30e and 30f and are threaded as a prerequisite to receiving wing nuts 38 thereon. Said wing nuts 38 are adapted to be rapidly threaded into position and released therefrom so as to adjust the location of the means 15 relative to the boat rail R.

The clamp member 28 which is shown as the uppermost clamp member in FIG. 2 is preferably formed as a casting or molding and includes therewith an attached sleeve portion indicated at 44. A sleeve portiton 44 is provided with an axial bore for receiving therein a shaft or extended member 46. The member 46 is of some predetermined length and extends sufficiently through the sleeve 44 to expose a relatively small, tapered portion indicated generally at 46a. The tapered portion 46a carries thereon an expandable member indicated at 48 which expandable member is in the form of a pair of spring-loaded ears such as those found on toggle bolts. When extended, the toggle ears extend to a greater width than the diameter of the hole provided in the integrally cast sleeve 44. By these means the shaft 46 is locked against longitudinal movement through the sleeve 44 without the conscious, overt act of manually suppressing the projecting members of the toggle structure 48. The upper end of the apparatus is provided with a projecting sleeve or washerlike member or shoulder 46b secured to shaft 46 to provide a stop or rest whereby longitudinal movement in the other direction of the shaft relative to the sleeve is prevented. It will be appreciated that the washer 46b serves as a stop and support.

The shaft 46 is provided with an intermediate length above the washer 46b and extends towards the pair of projecting ears 24 as previously noted. The upper end of the shaft 46 is adapted to receive therethrough the pin 25 in a loose, rotatable fit. Without overextended, elaborate details on the joint means of the present invention, it should be noted that the shaft 46 is adapted to rotate fully 360° for an indefinite number of revolutions in relation to the sleeve 44. This provides one degree of freedom of the means of the present invention which co-operates with the axis of rotation in the pivot member 25 which is connected to the upper end of the shaft 46. It particularly should be noted that the axes above noted are mutually perpendicular and provide a full scope of swing of the means as previously noted. Moreover, the joint is made connectable wherein the shaft 46 may be retrieved from the sleeve 44 as desired upon manual manipulation of the means 48. On the other hand, it should be noted that engagement of the two above noted members is rapid since the shaft 46 need only be pressed against the hole of the sleeve 44 to compress the projecting members of the toggle member 48 and achieve rapid and quick insertion without difficulty.

A consideration should be given to operation of the invention of the present apparatus. In the first instance, the means provided include the releasable means indicated generally at 18. The U-shaped members 22 are clamped about the fishing rod as shown in FIG. 1 and the wing nuts 23 are rapidly engaged therewith to secure the fishing rod 12 relative to the means 18. It should be noted that most sportsmen use a fishing rod for an extended period of time and so this connection can be made with some assurance that the connection will be maintained throughout a fishing trip to provide little occasion for change. In addition, the means is moved longitudinally relative to the fishing rod 12 to assist in achieving balance wherein the ears 24 are positioned relative to the center of mass of the rod and reel together for improved balance and ease of handling.

The means 15 are preferably attached to the boat rail R at any predetermined location. This is achieved in the following manner. The wing nuts 38 are removed from the U-bolts 36 and the clamp members 28 and 30 are separated from one another. The clamp members are then positioned on opposite sides of the boat rail R and are aligned so that the U-bolts 36 may be inserted therein. On insertion of the U-bolts, the wing nuts 38 are utilized to force the members 28 and 30 against the boat rail R to secure the clamp therewith. On completion of such friction clamping, the means 15 are fixed in position relative to the boat rail and are ready to co-operate with the rest of the invention. In this regard, however, it should be noted that it is preferable to position the sleeve 44 with the passage therethrough extending in a generally vertical direction as is best illustrated in FIG. 1.

On completion of the connection of the means 18 to the fishing rod 12, the fishing rod 12 is carried to the boat rail and the shaft 46 is permitted to dangle downwardly therefrom. The shaft is conveniently and easily inserted through the positioned boat rail clamp member 15 with a relatively simple downwardly directed push; and thence, the rod and reel apparatus is secured relative to the boat rail R. In this regard, it should be noted that if the apparatus is allowed to dangle freely over the side of the boat, there is absolutely no opportunity for losing same into the usually deep water found where deep sea fishermen fish. Moreover, the danger of losing a fish and the fishing apparatus is completely abrogated. The apparatus of the present invention may be particularly useful during trolling when the fisherman is usually off guard and slightly relaxed against the possibility of catching a fish. Moreover, the balance of the present invention is useful in permitting the labor of the fisherman to be directed to the retrieval of the fishing line without requiring excessive gyrations or movements of the rod and reel. On the other hand, should the fisherman desire to move about the boat while retrieving the fish, he is free to depress the toggle member 48 to pull through the hole in the sleeve 44 whereupon the rod and reel is freed from the boat rail R. It should be recognized that the member 18 and the shaft 46 are left dangling on such removal; however, it is believed that such means of the present invention does not provide a handicap or source of interference to the fisherman as he uses the rod and reel apparatus F in the conventional manner.

Certain alterations can be added to the present invention without departing therefrom. As one example thereof, it might be possible to place a number of sleeves 44 along the boat rail R so that the fisherman has a choice and may insert the shaft 46 in any one of the number of sleeves 44. This provides mobility for the fisherman while yet providing a relatively simple and fixed installation relative to the boat rail R.

The connective means 18 can be associated with other attachments for fishing apparatus. By way of example and not limitation, the projecting connective means 24 can be integrally formed on other apparatus secured to the fishing gear and provide a pivotal connection to the joint means 16.

In FIG. 3 of the drawings is illustrated an alternative embodiment of that portion of the apparatus of the present invention designated generally 15 in FIG. 1 and FIG. 2 which includes the sleeve 144 and the apparatus for securing such sleeve to the rail R'.

As shown, such apparatus includes a pair of opposed laterally extending plates 128 and 130, respectively, which are provided for clamping the rail R'. Such plates or clamping members are provided with laterally extending arcuate or curved inwardly facing surfaces 128a and 130a, respectively, which are contoured to approximate the curve of the rail R'. Also, such clamping plates 128 and 130, respectively, are provided with centrally disposed recesses 129 and 131, respectively, which, as shown, are enlarged portions of the laterally extending arcuate recesses 128a and 130a, respectively.

The plate 128 is provided with a pair of laterally spaced countersunk openings 135 which receive bolts 135a which extend through spaced openings 135b in the facing plate 130. A U-bolt 136 extends through the plate 128 with its outer ends projecting through a pair of spaced slots 136a in the plate 130. The bolts 135a as well as the U-bolt 136 are provided with wing nuts 138 which may be tightened to force the clamping plate 130 against the rail R' for securing the apparatus of this invention to such rail. Also, caps or stops 139 which may be formed of rubber or other suitable material are screwed onto the outer ends of the bolts 135a and the U-bolt 136 to prevent the loss of the wing nuts 138 from the bolts on which they are carried and to prevent injury to the operator.

A laterally extending slot 140 is provided in the body of the sleeve 144 for receiving the cross-member portion 136c of the U-bolt 136. Also, the body of the sleeve 144 is provided with a removable bottom cover or latch retainer 145 which may be secured to the sleeve body 144 and the clamping plate 128 by means of screws (not shown) or other suitable securing means. With the bottom cover 145 in position as shown in FIG. 3 of the drawings, the cross-member portion 136c of the U-bolt 136 is pivotally mounted in the laterally extending slot 140 so that when the wing nuts 138 are loosened on such U-bolt 136, it may be pivoted downwardly out of the slots 136a to facilitate removal of the apparatus of this invention from the rail R'.

The bottom cover 145 includes a laterally extending bottom plate 145a as well as an upstanding side member 145b and an upstanding pin 145c disposed centrally thereof. Such bottom cover also includes an opening or bore 145d which is in line with the longitudinally extending bore 150 in the sleeve 144. Such bores 150 and 145d are provided for receiving the longitudinally extending shaft or pin 146 which is rotatably mounted therein.

A locking tongue or latch 151 is shown carried in the locking tongue retainer or bottom cover 145. Such locking tongue 151 comprises a longitudinally extending plate having a pair of depending fingers or projections 151a and 151b extending downwardly therefrom. Also, an opening 152 is provided in the longitudinally extending portion of the locking tongue 151 which is of substantially the same diameter as the bore 150 and the opening or bore 145d.

A spring 160 carried in the locking tongue retainer 145 engages the depending finger 151b and urges the locking tongue 151 laterally outwardly relative to the body of the sleeve 144 as shown in FIG. 3 of the drawings. The depending finger 151a engages the projection 145c to limit the lateral movement of such locking tongue 151 and retains it in the locking tongue retainer when the shaft 146 is not in the bore 150. As shown, the shaft 146 has a circumferentially extending groove 147 formed near the lower end thereof and also has an inwardly and downwardly tapered shoulder 149 formed thereon for engaging the inner wall of the opening 152 in the locking tongue 151 and urging it laterally when the shaft 146 is inserted into the bore 150. Alternatively, the locking tongue 151 may be moved laterally manually to align the opening 152 with the bore 150 to receive the pin 146 when it is inserted into the bore 150.

As shown, the downwardly depending finger 151a engages the upstanding projection 145c so as to limit the lateral movement of the locking tongue 151 and thereby align the opening 152 with the bore 150. After such shaft 146 has been lowered into the bore 150 a sufficient distance to align the groove 147 with the locking tongue 151, the spring 160 will urge the locking tongue laterally outwardly so that a portion of the locking tongue 151 adjacent the opening 152 will be inserted into the groove 147 to lock the shaft 146 into the bore 150. While such shaft is locked in the bore 150, it is also freely rotatable therein so as not to restrict the use of the apparatus of this invention. In the event a fisherman should wish to lift his fishing pole and remove the shaft 146 from the bore 150, he need only to slide in the locking tongue a sufficient distance to remove it from the circumferentially extending groove 147 and align it with the bore 150 and thereby free the shaft 146 for easy removal for casing or other purposes. Thus, with the apparatus of the alternate embodiment of the present invention shown in FIG. 3 of the drawings, in the event a fisherman hooks a fish and wishes to free his fishing pole from the clamping apparatus of this invention, he may do so by merely sliding the locking tongue and lifting the shaft 146 out of the bore 150 and thereafter the fishing pole will be free for manual manipulation or for casting out line in any direction he may desire or in landing the fish.

A second alternative embodiment of the apparatus of the present invention shown in FIGS. 4 and 5 of the drawings is provided for permanent or temporary attachment to a flat surface 201 such as will be found where a wooden board is used as a rail on a pier or a boat. This embodiment of the present invention preferably comprises a frusto-conical body 210 having a radially extending shoulder 211 formed integrally therewith for receiving screws 212 or bolts or other suitable securing means which extend through the annular shoulder or skirt 211 and are fixed to the board or other flat surface 201.

Such body 210 is also provided with a substantially vertically extending bore 250 in which the shaft 146 is rotatably mounted. A transverse bore or opening 255 extends laterally of the body 210 and intersects the vertically extending bore 250 such transverse bore 255 is provided for receiving a sliding locking tongue 251 which comprises a laterally extending plate having an opening 252 therein corresponding to the size of the bore 250. Also, locking tongue 251 has a second opening 253 which surrounds a vertically disposed pin 240. A spring 260 is provided in the laterally extending opening 255 for engaging the end 251a of the locking tongue 250 and urging it laterally outwardly.

As shown, when the shaft 146 is not in the bore 250, the spring 260 urges the locking tongue 251 laterally outwardly so that the pin 240 engages one side of the opening 252 to limit the lateral travel of the locking tongue 251. When it is desired to insert the shaft 146 into the bore 250 and lock it in place, the locking tongue 251 may be manually moved laterally inwardly by depressing the spring 260 to align the opening 252 with the bore 250. When the circumferentially extending groove 147 near the lower end of the shaft 146 is aligned with the locking tongue 251, it may be released so that the spring 260 will urge the locking tongue laterally outwardly and thereby cause the portion of the locking tongue 251 adjacent the opening 252 to enter the circumferentially extending groove 147 and thereby lock the shaft 146 in the bore 250.

As in the case with the alternate embodiment of the apparatus of this invention shown in FIG. 3, when the fisherman wishes to lift his fishing pole and withdraw the shaft 146 from the bore 250, he may manually move the locking tongue 251 laterally so as to align the opening 252 with the bore 250 and thereby free the shaft 146 so that it may be quickly and easily removed from such bore 250.

The foregoing disclosure and description of the invention are illustrative and explanatory thereof, and various changes in the size, shape, and materials as well as in the details of the illustrated construction may be made without departing from the spirit of the invention.

What is claimed is:

1. A releasable fishing rod holder for releasably mounting a fishing rod and reel on a structural member of a boat comprising:
    (a) a longitudinally extending body having a pair of arcuate recesses extending longitudinally thereof for receiving a fishing rod handle mounted thereon and a transverse depression for receiving a fishing reel mounted on said rod;
    (b) clamp means on opposite sides of said depression for clamping said fishing handle against said arcuate recesses;
    (c) a shaft pivotally mounted on said longitudinally extending body and having an annular latching groove;
    (d) a support member having a bore therein for receiving and rotatably mounting said shaft;
    (e) quick acting latch means including a sliding latch member having an aperture therein at least as large as said bore in said support member and adapted to engage in said latching groove to retain said shaft rotatably in said bore; and
    (f) spring means disposed internally of said body for urging said latch member into said groove of said shaft, and adapted to be compressed by said latch member to align said aperture with said bore for permitting a release of said shaft from said latch member.

2. The structure of claim 1 including a clamp means on said support means comprising a pair of laterally extending arcuate surfaces adapted to be drawn together to grip a member therebetween, and means for urging said pair of arcuate surfaces together.

3. The structure of claim 2 wherein said means for urging said pair of arcuate surfaces together includes a bolt means pivotally mounted adjacent one of said surfaces for pivotal movement away from the other of said surfaces to facilitate rapid installation and removal of said support means on a boat structure.

References Cited

UNITED STATES PATENTS

| | | | |
|---|---|---|---|
| 2,484,427 | 10/1949 | Schwenk | 248—42 |
| 2,553,231 | 5/1951 | Bayto | 248—42 |
| 2,596,247 | 5/1952 | Kacsor | 43—21.2 |
| 2,698,725 | 1/1955 | Triplett | 248—38 |
| 2,704,412 | 3/1955 | Davis | 248—38 X |
| 3,148,851 | 9/1964 | Condon | 248—229 X |

FOREIGN PATENTS

| | | |
|---|---|---|
| 19,177 | 8/1914 | Great Britain. |
| 37,949 | 12/1914 | Sweden. |

ROY D. FRAZIER, Primary Examiner

FRANK DOMOTOR, Assistant Examiner

U.S. Cl. X.R.

248—229